United States Patent

Ewing, Jr. et al.

[11] Patent Number: 5,674,585
[45] Date of Patent: Oct. 7, 1997

[54] COMPOSITE THERMAL INSULATION STRUCTURE

[75] Inventors: Joseph H. Ewing, Jr., Lake Park, Fla.; Saed Safai, Vernon, Conn.

[73] Assignee: United Technologies Corporation, Hartford, Conn.

[21] Appl. No.: 559,751

[22] Filed: Nov. 15, 1995

[51] Int. Cl.$^6$ ............... B32B 3/02; B32B 5/12; B32D 39/00
[52] U.S. Cl. ............... 428/96; 428/86; 428/95; 428/112; 428/119; 428/120; 156/72; 228/170; 976/DIG. 160
[58] Field of Search ............... 428/86, 96, 112, 428/119, 120, 95; 976/DIG. 160; 156/72; 228/170

[56] References Cited

U.S. PATENT DOCUMENTS

| | | | |
|---|---|---|---|
| Re. 33,463 | 11/1990 | Sauder et al. | 428/99 |
| 3,250,661 | 5/1966 | Walker | 428/86 |
| 3,603,260 | 9/1971 | Johnson | 102/105 |
| 3,711,361 | 1/1973 | Casadevall | 428/86 |
| 3,821,065 | 6/1974 | Copeland et al. | 428/86 |
| 3,832,815 | 9/1974 | Balaz et al. | 52/227 |
| 3,928,694 | 12/1975 | Reinhard | 428/95 |
| 3,930,916 | 1/1976 | Shelley | 156/71 |
| 4,194,036 | 3/1980 | Davis et al. | 428/74 |
| 4,238,257 | 12/1980 | Remi et al. | 156/71 |
| 4,324,602 | 4/1982 | Davis et al. | 156/71 |
| 4,324,843 | 4/1982 | Brennan et al. | 428/112 |
| 4,341,826 | 7/1982 | Prewo et al. | 428/112 |
| 4,595,637 | 6/1986 | Eaton et al. | 428/608 |
| 4,738,902 | 4/1988 | Prewo et al. | 428/112 |
| 4,927,684 | 5/1990 | Asensio et al. | 428/95 |
| 5,115,962 | 5/1992 | Anderson et al. | 228/120 |
| 5,139,839 | 8/1992 | Lim | 428/76 |
| 5,178,922 | 1/1993 | Ferrier et al. | 428/86 |
| 5,198,282 | 3/1993 | Baker et al. | 428/114 |
| 5,334,438 | 8/1994 | Saugnac | 428/212 |
| 5,376,427 | 12/1994 | Singh et al. | 428/110 |
| 5,376,598 | 12/1994 | Preedy et al. | 501/89 |
| 5,418,194 | 5/1995 | Dawers et al. | 501/52 |
| 5,439,624 | 8/1995 | Anderson et al. | 264/66 |

OTHER PUBLICATIONS

G. Johner, V. Wilms, K.K. Schweltzer, P. Adam "Experimental and Theoretical Aspects of Thick Thermal Barrier Coatings for Turbine Applications" pp. 155–166.

Adiabatic Diesel Engine, "Advanced Adiabtic Diesel Engine for Passenger Cars", R.R. Sekar and R. Kamo, Paper 840434 Presented at the 1984 SAE International Congress & Exposition, Detroit, MI, Feb.–Mar. 1984.

Adiabatic Diesel Engine, Figure 19, Zirconia Insulated Engine, SAE International Congress & Exposition, 1994 Detroit, Michigan.

Adiabatic Diesel Engine, Figure 18, AA750 Cross Section End View, Tacom, SAE International Congress & Exposition, Detroit, MI.

*Primary Examiner*—Terrel Morris
*Attorney, Agent, or Firm*—Brooks, Haidt, Haffner & Delahunty

[57] ABSTRACT

A composite thermal insulation structure particularly suited for gas turbine engine applications is disclosed. An aspect of the present invention includes a composite thermal insulation structure having a backing, a ceramic pile woven substantially perpendicular into the backing, and a ceramic matrix material infiltrated in the ceramic fiber pile.

11 Claims, 3 Drawing Sheets

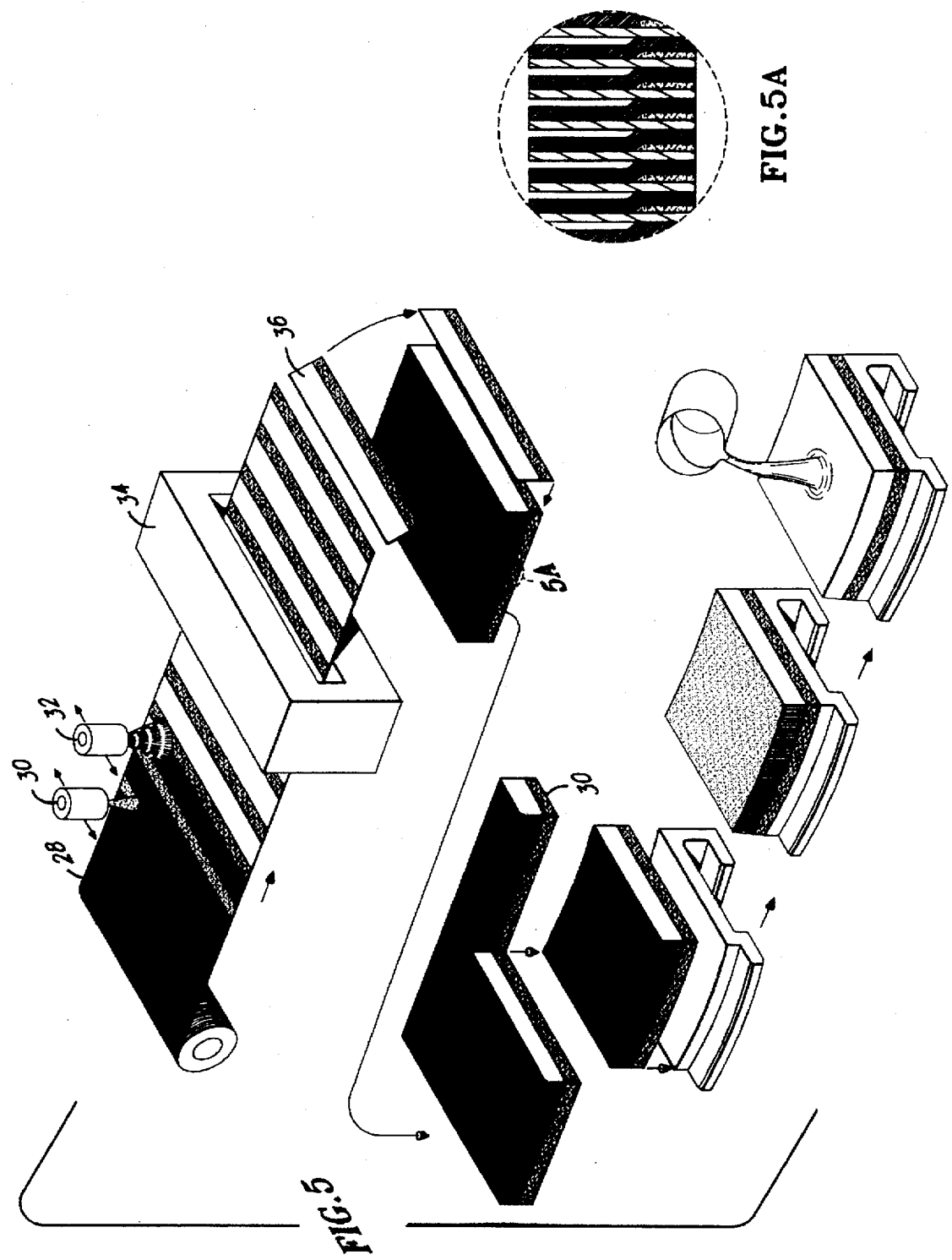

5,674,585

COMPOSITE THERMAL INSULATION STRUCTURE

This invention was conceived under a Government contract awarded by the Department of the Air Force. The Government has certain rights in this invention.

BACKGROUND OF THE INVENTION

1. Technical Field

This invention relates to composite thermal insulation structures particularly suited for gas turbine engine applications.

2. Background Information

Gas turbine engines operate at extremely high temperatures for increased performance and efficiency. The temperature at which a gas turbine engine operates depends largely upon the material capabilities of the individual gas turbine engine components.

Most modern gas turbine engine components are made of superalloys because these materials typically exhibit desirable properties at elevated temperatures, even at temperatures near the melting point of the superalloys. However, due to the demand to improve efficiency, operating temperatures are increasing so dramatically that in some circumstances the superalloy material alone cannot withstand the harsh environment without degrading. Thus, it becomes necessary to provide effective thermal insulation for the components exposed to this harsh environment.

One such material which possesses excellent high temperature capabilities, and thus potentially desirable properties for thermally insulating gas turbine engine components, is ceramic. Although ceramic materials possess excellent high temperature insulating capabilities, the thermal growth differences between metal and ceramic make it difficult to integrally bond bulk ceramic articles to metallic articles without the bulk ceramic spalling or delaminating as a result of heat exposure.

Current use of bulk ceramic insulators (i.e. thermal barriers) for gas turbine engine components is usually limited to a thickness less than about 0.030 inches (0.076 cm) to reduce the chance of spallation. This limitation in thickness, however, limits their effectiveness as an insulator. Thicker insulators have been tried in the past, and although they provide more effective insulation they suffer from delamination problems.

Accordingly, scientists and engineers working under the direction of Applicants' Assignee are still seeking to improve the high temperature capabilities of gas turbine engine components by developing effective insulating structures.

DISCLOSURE OF THE INVENTION

An object of the present invention is to make delamination resistant, thick ceramic insulation feasible, particularly for gas turbine engine applications.

According to the present invention, a delamination resistant composite thermal insulation structure particularly suited for gas turbine engine applications is disclosed. One aspect of the invention includes a structure comprising a backing, a ceramic fiber pile woven substantially perpendicular into the backing, and a ceramic matrix material infiltrated in the ceramic fiber pile.

Another aspect of the present invention includes a method for attaching a composite thermal insulation structure to a substrate. The method includes the steps of providing a backing; weaving a plurality of ceramic fibers substantially perpendicular into the backing, thereby forming a ceramic fiber pile; brazing the backing to the substrate; and infiltrating the ceramic fiber pile with a ceramic matrix material.

Yet another aspect of the invention includes a composite thermal insulating structure made by a direct braze approach. This approach has the advantage of eliminating the need for the backing, thereby resulting in a structure of less weight.

Another advantage of the present invention is that it is an effective insulator for gas turbine engine components because it can be applied in a substantial thickness.

Yet another advantage of the present invention is that it possesses excellent thermal shock resistance and durability due to high through-thickness strength combined with low in plane strength. The present invention possesses low in plane strength because of its lack of in plane reinforcing fibers. Low in plane strength promotes the formation of many small "mudflat" cells which experience low stresses. The present invention solves the durability problem present in prior art techniques by orientating the strengthening fibers in the direction that strength is needed most, the through-thickness direction.

Still another advantage of the present invention is that it has particular utility for blade outer airseal applications.

BRIEF DESCRIPTION OF THE DRAWINGS

FIG. 5 is a schematic illustration of a method of mass producing composite thermal insulation structures of the present invention without the need to weave a "rug-like" structure.

FIG. 5A is a schematic illustration of an enlarged view of a portion of FIG. 5.

BEST MODE FOR CARRYING OUT THE INVENTION

Figure 1:
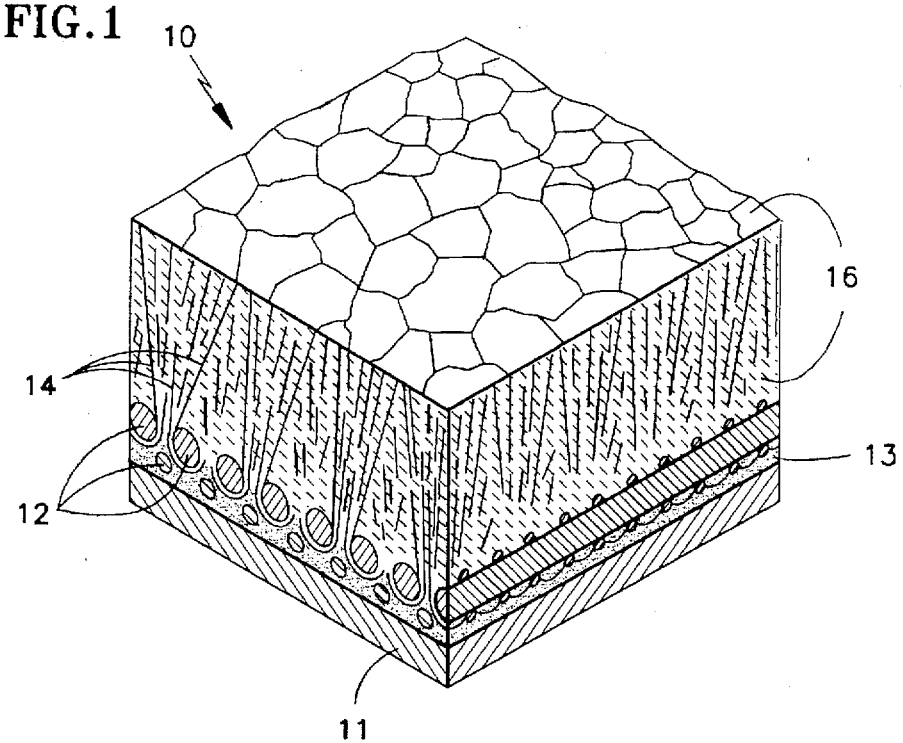
FIG. 1 is a composite thermal insulation structure of the present invention.

As shown in FIG. 1, composite thermal insulation structure 10 of the present invention includes a backing 12, a ceramic fiber pile 14 woven substantially perpendicular into the backing 12, and a ceramic matrix material 16 infiltrated in the ceramic fiber pile 14.

Backing 12 may be made from any suitable material. However, if a metal structure, such as 11, is to be insulated then backing 12 is made from a plurality of metal wires. This will enable subsequent attachment of the backing 12 to metal structure 11 by brazing with braze material 13. The wires of backing 12 should be at least 50 mils (1.27 mm) in diameter to ensure that the ceramic fibers of the ceramic fiber pile 14 do not break as they are woven around the wires. The particular wire diameter depends on the diameter and strength of the ceramic fibers employed. The choice of wire material depends on the design operating temperature of the wire and the braze material 13. At temperatures between about 1000° F. (538° C.) and about 1400° F. (760° C.), nickel-chrome may be used for the wire material. A suitable wire material is Nichrome® (80% Ni and 20% Cr, by weight), by the Driver-Harris Company. The wires may be solid, however, if a structure 10 of less weight is desired then hollow braided wire or hollow wire tubing may be used.

Figure 2A:
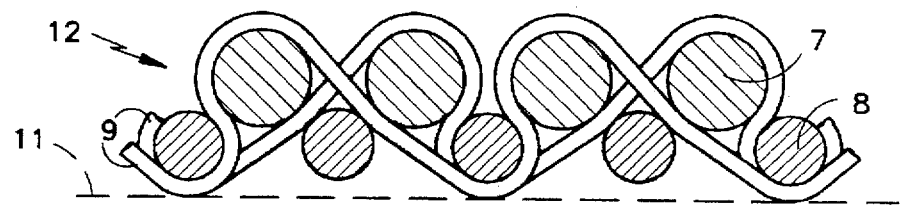
FIG. 2A shows the backing of the present invention.

An example of a suitable backing construction is shown in FIG. 2A. In this particular example, two parallel levels of different diameter wires, upper level wires 7 and lower level wires 8, are employed. Upper level wires 7 may have a larger diameter than lower level wires 8. Perpendicularly woven smaller wires 9 tie the lower level wires 8 to the upper level wires 7 and hold the backing 12 together.

Figure 2B:
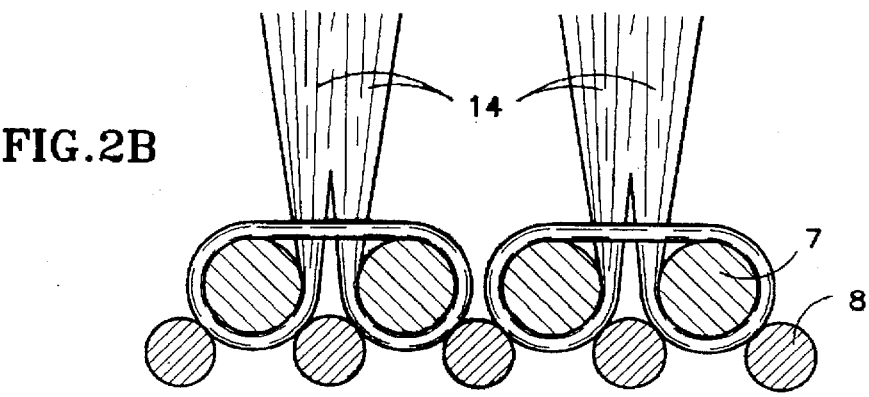
FIG. 2B shows the weave architecture of the ceramic fiber pile of the present invention.

The ceramic fiber pile 14 is attached to backing 12 by wrapping individual ceramic fibers around upper level wires 7, as shown in FIG. 2B. The fibers essentially cover the surface of the upper level wires 7, thus minimal exposed wire surface of the upper level wires 7 is available for braze bonding. Accordingly, the lower level wires 8 provide the metallic surface for the subsequent brazing of backing 12 to metallic substrate 11.

The fibers are woven or looped such that they are substantially perpendicular to backing 12 and form a "rug-like" structure between about 0.10 inches (0.25 cm) and about 5 inches (12.7 cm) thick. One of ordinary skill in the art will appreciate that the thickness is dependent, in part, on intended use. The individual ceramic fibers may include, but are not limited to, alumina, silica, zirconia, mullite, silicon carbide, boron nitride and mixtures thereof with exemplary fiber diameters of between about 1 micron (0.0001 cm) and about 30 microns (0.003 cm). A preferred fiber is that sold by the Minnesota Mining and Manufacturing Company (3M) under the name of Nextel® 312 which comprises, by weight percent, 62% $Al_2O_3$, 24% $SiO_2$ and 14% $B_2O_3$. Both mullite and alumina fibers are available in suitable fiber diameters of between about 7 microns (0.0007 cm) and about 13 microns (0.0013 cm). The relationship between the fibers and metal wires may generally be characterized as follows: the stress in the fibers=[(modulus of elasticity of the fibers)×(the diameter of the fibers)]/diameter of the wires. We have found that setting this value to less than or equal to (the ultimate strength of the fibers)/2 results in suitable residual fiber strength after the fibers are wrapped around the wires.

Once the ceramic fiber pile 14 is securely attached to the backing 12, the surface of the backing 12 opposite the "rug-like" portion may be brazed (using known techniques) to metal substrate 11 using an appropriate, conventional braze material 13. The choice of braze material 13 depends on factors such as the materials being joined and the design operating temperature of the composite thermal insulation structure 10, particularly in the area of the applied braze material 13 (braze zone). Suitable braze materials include, but are not limited to, Nicrobraze® LM (82.4% Ni, 7% Cr, 4.5% Si, 3.1% B, 3% Fe, by weight) or Nicrobraze® 30 (70.8% Ni, 19% Cr, 10.2% Si, by weight), by the Wall Colmonoy Company.

The ceramic fiber pile 14 may then be infiltrated with a ceramic matrix material 16. The ceramic matrix material 16 may include, but is not limited to, oxide, boride, carbide, nitride and carbon matrix materials, as well as mixtures thereof. Specifically, the ceramic matrix material 16 may include, but is not limited to, matrices of aluminum nitride, silicon nitride, silicon carbide, silicon boron nitride, mullite, aluminum oxide, zirconium oxide and silicon oxide.

The ceramic fiber pile 14 may be infiltrated with the ceramic matrix material 16 by conventional infiltration techniques including, but not limited to, ceramic paste processing or sol-gel processing. Generally, in ceramic paste processing of the present invention, a ceramic paste is troweled into the ceramic fiber pile 14 and allowed to harden, which may take between about 5 minutes and about 4 hours depending on the particular paste employed. Suitable ceramic pastes include, but are not limited to, Ceramabond™ 569 (aluminum oxide paste) and Ceramabond™ 516 (zirconium oxide paste), by Aremco Products, Inc. The infiltrated fiber pile would then be cured at between about 500° F. (260° C.) and about 1500° F. (816° C.) for between about 1 hours and about 4 hours to remove moisture and strengthen the composite thermal insulation structure 10.

In the sol-gel process, an aqueous ceramic solution (or sol) of the ceramic matrix material 16 is poured into the ceramic fiber pile 14 and allowed to evaporate, preferably under a heat lamp, thereby leaving a ceramic deposit. Evaporation should take between about 1 hour and about 4 hours. Several applications of sol may be required to achieve a rigid densified structure. The infiltrated fiber pile is then cured at between about 500° F. (260° C.) and about 1500° F. (816° C.) for between about 1 hour and about 4 hours to remove moisture and strengthen the composite thermal insulation structure 10. Preferably, a material such as $SiO_2$ or $Al_2O_3$ is infiltrated into the fiber pile 14 by sol-gel processing. An example of a suitable sol material is E. I. Du Pont De Numours and Company's Ludox® (silica sol). Advantages of sol-gel processing include the ability to achieve effective homogenity, as well as the ability to infiltrate under low reaction temperatures.

Alternatively, the ceramic fiber pile 14 may be infiltrated prior to attaching the backing 12 to the substrate 11, although this is not preferred.

The composite thermal insulation structure 10 of the present invention has been described thus far for application to metal support structures. However, the application of composite thermal insulation structure 10 to non-metallic structures, such as composite structures, is also possible. For example, the structure 10 may be integrally woven as part of the weave architecture, as shown in FIG. 3 or formed separately and bonded to an existing support structure, as shown in FIG. 4.

Figure 3:
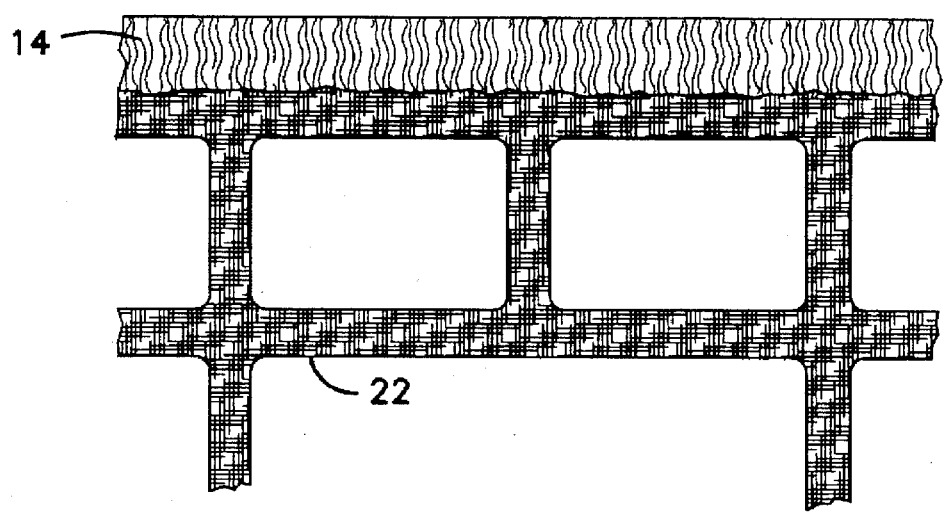
FIG. 3 is a composite thermal insulation structure of the present invention integrally attached to a three dimensional composite support structure.

Specifically, FIG. 3 shows a fiber reinforced ceramic composite support structure 22. The fiber pile 14 is woven as an integral part of the composite support structure 22, which is woven at the same time using conventional three dimensional weaving techniques. The fiber pile 14 may then be infiltrated at the same time as the support structure 22 with the same matrix material, preferably using the above described sol-gel process.

Figure 4:
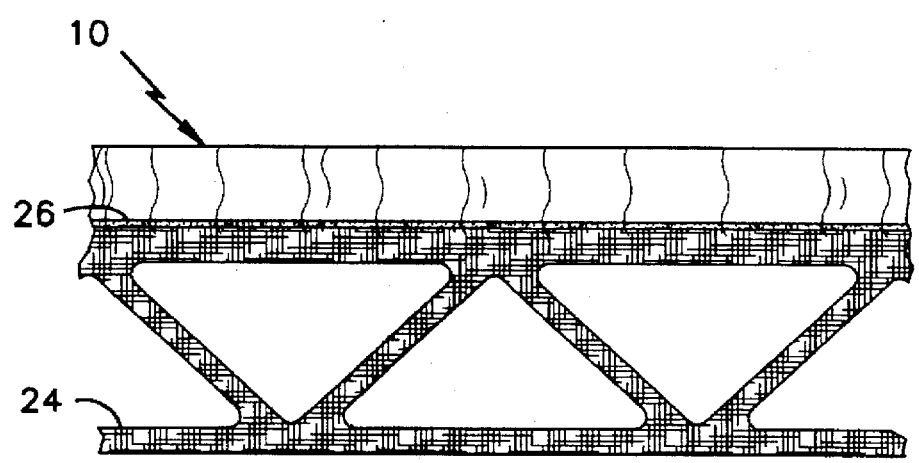
FIG. 4 is a composite thermal insulation structure of the present invention bonded to a three dimensional support structure.

FIG. 4 shows composite thermal insulation structure 10 bonded to a support structure 24 which, in this case, may be suitable for a reusable single stage to orbit vehicle. The material for bond layer 26 may be characterized as an organic material and includes, but is not limited to, materials such as polyimide adhesives. Support structure 24 may be made from any suitable material. Those skilled in the art will recognize that the material is dependent on various factors such as intended use.

Regardless of whether the composite thermal insulation structure 10 is attached to a metallic structure or a non-metallic structure, the principle is still the same: to have a durable thermal barrier for the thermal loads and a cool support structure for the mechanical loads.

The above described embodiments of the present invention are optimum for low cost rapid development of the composite thermal insulation structure 10 using proven fabrication techniques, particularly weaving. However, an alternate embodiment of the present invention may be more advantageous for mass production. This embodiment involves a direct braze approach which eliminates the need to weave a "rug-like" structure. As shown in FIG. 5, a roll of unidirectional, individual ceramic fibers 28 is provided which is then unrolled into a sheet-like form. A conventional conveyor belt apparatus would be suitable for providing the necessary motion to move the fibers 28 along an assembly line for processing. The ceramic fibers 28 in this direct braze process may be substantially thicker than those used in a woven process because fiber bending around wire is not required. Fiber diameters between about 5 mils (0.013 cm) and about 10 mils (0.025 cm) may be used.

Commercially available ceramic brazing material 30 such as Ticusil® (68.5% Ag, 27% Cu, 4.5% Ti, by weight), by Wesgo, Inc., may then be applied (preferably by spraying) in a section by section fashion, as shown in FIG. 5, across the width of the fibers to a thickness of between about 5 microns (0.0005 cm) and about 50 microns (0.005 cm). The width of the applied ceramic brazing material 30 may be between about 0.020 inches (0.0005 m) and about 0.100 inches (0.0025 m). One of ordinary skill in the art will appreciate that the width and thickness of the applied braze material is dependent, in part, on intended use.

An organic based adhesive binder 32 may then be applied (preferably by spraying) to the unbrazed fibers at a thickness between about 5 microns (0.0005 cm) and about 50 microns (0.005 cm). The adhesive binder 32 may be characterized as organic. Suitable binders include, but are not limited to, acrylics and epoxies. The adhesive binder 32 allows for handling and processing of the fibers 28.

The sheet of fibers 28 then enters a furnace 34 for curing. Curing temperature may be between about 200° F. (93° C.) and about 300° F. (149° C.). The time for curing should take only minutes, but one of ordinary skill in the art will appreciate that curing time is dependent on the particular materials employed.

The sheet of fibers 28 are then cut, preferably by laser, into individual strips 36 and stacked as shown in FIG. 5. If necessary, a perimeter supporting device may be employed to hold the stacked strips 36 in place. The stack may be cut into a desired shape and applied to a substrate (preferably a metallic substrate) such that the ceramic brazing material 30 contacts the surface of the metallic substrate. The structure may then be heated in a conventional air oven for between about 1 hour and about 4 hours at between about 500° F. (260° C.) and about 1000° F. (538° C.) to bake out the adhesive binder 32. The structure may then be transferred to a vacuum furnace for brazing at a temperature between about 1600° F. (871° C.) and about 2100° F. (1149° C.) for between about 1 hour and about 4 hours. The structure may then be infiltrated with a ceramic sol-gel material, including but not limited to $SiO_2$ or $Al_2O_3$ and cured, typically between about 500° F. (260° C.) and about 1500° F. (816° C.) to produce a composite thermal insulation structure 10. Limited mudflat cracking may thereby result with subsequent mudflat cracking upon use.

The above approach has the advantage of eliminating the need for the metal wire backing 12, thereby resulting in a structure 10 of less weight. Another advantage of this embodiment is that it provides effective surface hardness for erosion resistance. This is particularly advantageous for blade outer air seal applications.

Yet another advantage is that it may be possible to form cooling holes in composite thermal insulation structure 10 if film cooling is required. If this is the case then laser drilling would be the preferred method of forming the cooling holes.

The advantages of all of the above described embodiments of the present invention are numerous. For example, the thickness of the present invention is not limited by durability concerns. A thickness of 1 inch (2.54 cm) or more is possible.

Many of the current limitations on insulating technology are due to material limitations. Practical metals have been pushed to near their melt points, which are relatively low, while high temperature ceramic substitutes have not exhibited the desired durability. The present invention is a sensible way to address the limitations of both metals and ceramics and to take advantage of their particular assets. With the present invention, thermal loads are absorbed by the ceramic material which stays integrally attached to a cool metal substrate which carries the mechanical loads.

The maximum temperature capability of the present invention is limited only the choice of the fiber/matrix system. For example, the maximum continuous use temperature for a Nextel®/silica system may be limited to less than about 2200° F. (1204° C.). This could be extended to 3000° F. (1649° C.) by using alumina fibers with an alumina matrix. Using zirconia fibers with a zirconia matrix could allow a 4000° F. (2204° C.) surface temperature to be achieved. This approaches the combustion temperature of current jet fuels and raises the possibility of having almost uncooled parts. However, some level of backside cooling may be required to prevent the metal substrate from eventually reaching 4000° F. (2204° C.). This level of cooling can be minimized by increasing the thermal resistance of the composite thermal insulation structure 10. This is possible by using a porous less conductive matrix, including but not limited to, the above mentioned ceramic pastes with hollow ceramic microspheres known to those skilled in the art and/or by increasing the thickness of the structure 10. Reduced cooling air requirements in combination with higher surface temperature is extremely advantageous.

The present invention has particular utility in turbine blade outer airseal applications because it results in reduced cooling air requirements, tighter build clearance, and improved abradability. The unidirectional reinforcement of the present invention is believed to allow the simultaneous achievement of both abradability and erosion resistance. In the past these two characteristics had essentially been mutually exclusive.

Another important application of the present invention is in advanced low nitrogen oxide combustors for high speed civil transport. Traditional film cooling may not be utilized in portions of these combustors. A zirconia based structure 10 for protecting combustor walls may provide an effective insulating mechanism for high temperature environments, such as about 3800° F. (2093° C.), with only backside cooling and no film cooling.

Other turbine engine applications include turbine vane platforms, shrouds, turbine exhaust cases, and augmentors. Applied to a turbine exhaust case, it may allow a metallic component to run cool enough to transmit bearing loads through the case struts which would eliminate the need for thermally isolated beating support tie rods. Other aerospace applications may include thermal protection systems for advanced spacecraft.

Outside of aerospace there are potential applications in the power generation and transportation industry. Electrodes for magnetic hydro-dynamic generators have always been a place where thick ceramic insulators are needed, however, poor durability with existing ceramics have made this impractical.

Efforts to improve fuel efficiency by developing an adiabatic diesel engine have attempted to bond ceramic caps to pistons. However, thick ceramic caps fail quickly. Thin caps last longer, but are not effective insulators. The present invention provides good insulation and the necessary durability for this application.

Although the present invention has been shown and described with respect to detailed embodiments thereof, it will be understood by those skilled in the art that various changes in form and detail thereof may be made without departing from the spirit and scope of the claimed invention.

What is claimed is:

1. A composite thermal insulation structure comprising a backing, a ceramic fiber pile woven substantially perpendicular into the backing, and a ceramic matrix material infiltrated in the ceramic fiber pile, wherein the composite thermal insulation structure is between about 0.25 cm and about 12.7 cm thick and includes a plurality of mudflat cells.

2. The composite thermal insulation structure of claim 1 wherein the ceramic fiber pile includes a plurality of individual ceramic fibers.

3. The composite thermal insulation structure of claim 2 wherein the backing is made from a plurality of metal wires, wherein the individual ceramic fibers are looped around the metal wires thereby forming a rug-like structure.

4. The composite thermal insulation structure of claim 3 wherein the wires have a diameter of at least about 1.27 mm.

5. The composite thermal insulation structure of claim 1 wherein the ceramic matrix material is selected from the group consisting of matrices of aluminum nitride, silicon nitride, silicon carbide, silicon boron nitride, mullite, aluminum oxide, zirconium oxide, silicon oxide, and mixtures thereof.

6. The composite thermal insulation structure of claim 1 wherein the fiber pile comprises a plurality of individual ceramic fibers selected from the group consisting of alumina, silica, zirconia, mullite, silicon carbide, boron nitride, and mixtures thereof.

7. The composite thermal insulation structure of claim 6 wherein the individual ceramic fibers have a diameter between about 0.0001 cm and about 0.003 cm.

8. The composite thermal insulation structure of claim 1 further including a supporting structure, wherein the backing is attached to the supporting structure.

9. A composite thermal insulation structure comprising:

(a) a backing including two parallel levels of different diameter metal wires, upper level wires and lower level wires, wherein the upper level wires have a larger diameter than the lower level wires and perpendicularly woven smaller wires tie the lower level wires to the upper level wires and hold the backing together;

(b) a ceramic fiber pile including a plurality of individual ceramic fibers looped around the metal wires thereby forming a rug-like structure, said fiber pile woven substantially perpendicular into the backing; and (c) a ceramic matrix material infiltrated in the ceramic fiber pile.

10. A method of producing a composite thermal insulation structure using a direct braze approach, the method comprising the steps of:

(a) providing a plurality of unidirectional, individual ceramic fibers;

(b) applying a ceramic brazing material in a section by section fashion across the width of the fibers, thereby resulting in brazed fibers and unbrazed fibers;

(c) applying an adhesive binder to the unbrazed fibers;

(d) curing the fibers, thereby producing a sheet of fibers;

(e) cutting the sheet of fibers into individual strips;

(f) applying the strips to a substrate such that the brazing material contacts the surface of the substrate;

(g) heating the fibers and the substrate to remove the binder and braze the fibers to the substrate;

(h) infiltrating the fibers with a ceramic material; and (i) curing to produce a composite thermal insulation structure.

11. A composite thermal insulation structure comprising:

(a) a support structure;

(b) a brazing material on the support structure;

(c) a plurality of ceramic fibers stacked substantially perpendicular to the support structure and bonded to the support structure; and (d) a ceramic matrix material infiltrated in the ceramic fibers.

* * * * *